April 14, 1936.  W. H. CURTIN  2,037,194

THERMOMETER

Filed Sept. 26, 1933

Inventor
William H. Curtin

By Hardway Rathey
Attorneys

Patented Apr. 14, 1936

2,037,194

UNITED STATES PATENT OFFICE 2,037,194

THERMOMETER

William H. Curtin, Houston, Tex.

Application September 26, 1933, Serial No. 690,997

1 Claim. (Cl. 73—52)

This invention relates to a thermometer and has more particular relation to the frame for supporting the thermometer tube.

An object of the invention is to provide a thermometer mounted on a frame which adapts the thermometer for testing liquids and the like.

Another object is to provide a novel type of thermometer frame having means for removably holding the tube in place to the end that a tube may be readily removed and another substituted.

With the above and other objects in view the invention has particular relation to certain novel features of construction, arrangement of parts, and use, an example of which is given in this specification and illustrated in the accompanying drawing, wherein.

Figure 1:
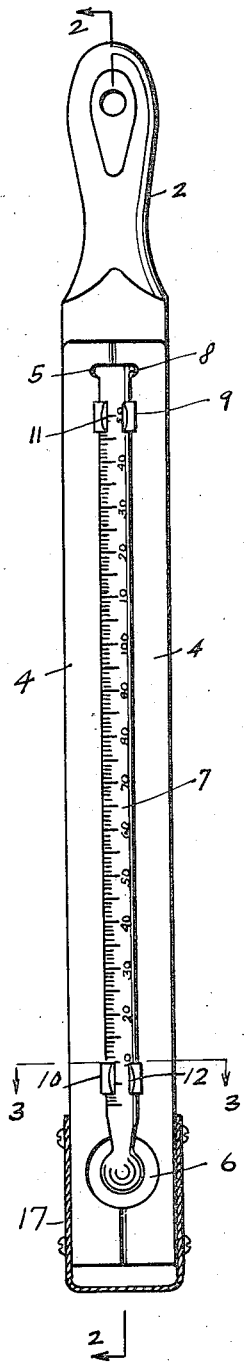
Figure 1 shows a front elevation of the thermometer shown partly in section.
Figure 2:
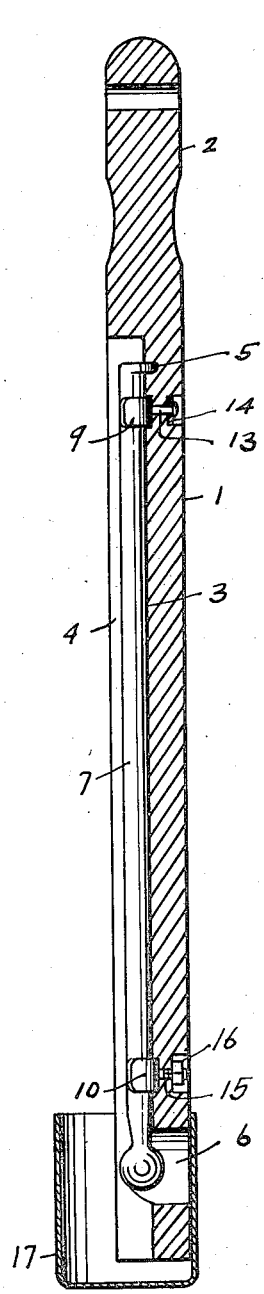
Figure 2 shows a longitudinal sectional view taken on the line 2—2 of Figure 1.
Figure 3:
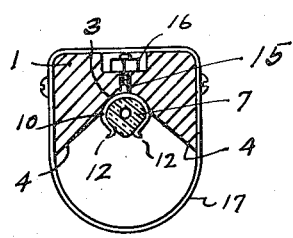
Figure 3 shows a cross sectional view taken on the line 3—3 of Figure 1.

In the drawing the numeral 1 designates the frame which terminates at one end in a grip 2. This frame may be made of any suitable material, preferably wood. At the front side of the frame and extending from the grip to the opposite end of the frame there is a groove 3, arcuate in cross sectional contour and from said groove the frame flares forwardly forming the faces 4, 4. At the lower end of the groove there is a circular opening 6.

The numeral 7 designates the thermometer tube whose upper end is provided with a flange 8 which fits in the notch 5 when the thermometer is seated in the groove 3.

There are the upper and lower arcuate clamps 9, 10 which are seated in the groove 3 preferably at the upper and lower ends thereof. These clamps are flexible and their outer ends terminate in the flared guides 11, 12. The upper clamp has the shank 13 fitted through the frame and through a metal washer 14 and its outer end is riveted. The lower clamp has the shank 15 fitted through the frame and threaded to receive the nut 16.

There is a cup 17 into which the lower end of the frame is extended, and to which said frame is secured.

In use the thermometer may be inserted into liquid to be tested and permitted to remain until the temperature of the liquid is indicated by the thermometer and then withdrawn. A sufficient quantity of liquid will be contained in the cup to submerge the bulb of the thermometer so the temperature of the bulb will remain the same until the thermometer is read. The opening 6 provides sufficient space for the thermometer bulb.

In case the tube 7 should become broken or should it be desired to substitute one tube for another, for any reason, said tube may be readily removed from the clamps 9, 10 and another tube substituted therefor. In substituting the new tube it may be positioned in place against the guides 11, 12 and then forced inwardly whereupon the clamps will spread until the tube is seated therein and then snapped into place around the tube.

The clamps may be secured to the frame by either of the methods described or by any other selected method.

What I claim is:

A thermometer frame having an opening provided to receive a thermometer bulb, said frame having a longitudinal groove extending along the front face thereof from said opening and having a notch above and aligned with the groove, arcuate flexible tongues forming clamps seated in the groove and spaced apart and whose outer ends terminate in flared guides, each clamp having a shank extended through the frame, securing means on each shank countersunk into the frame and securing the clamps in place.

WILLIAM H. CURTIN.